Patented Oct. 6, 1931

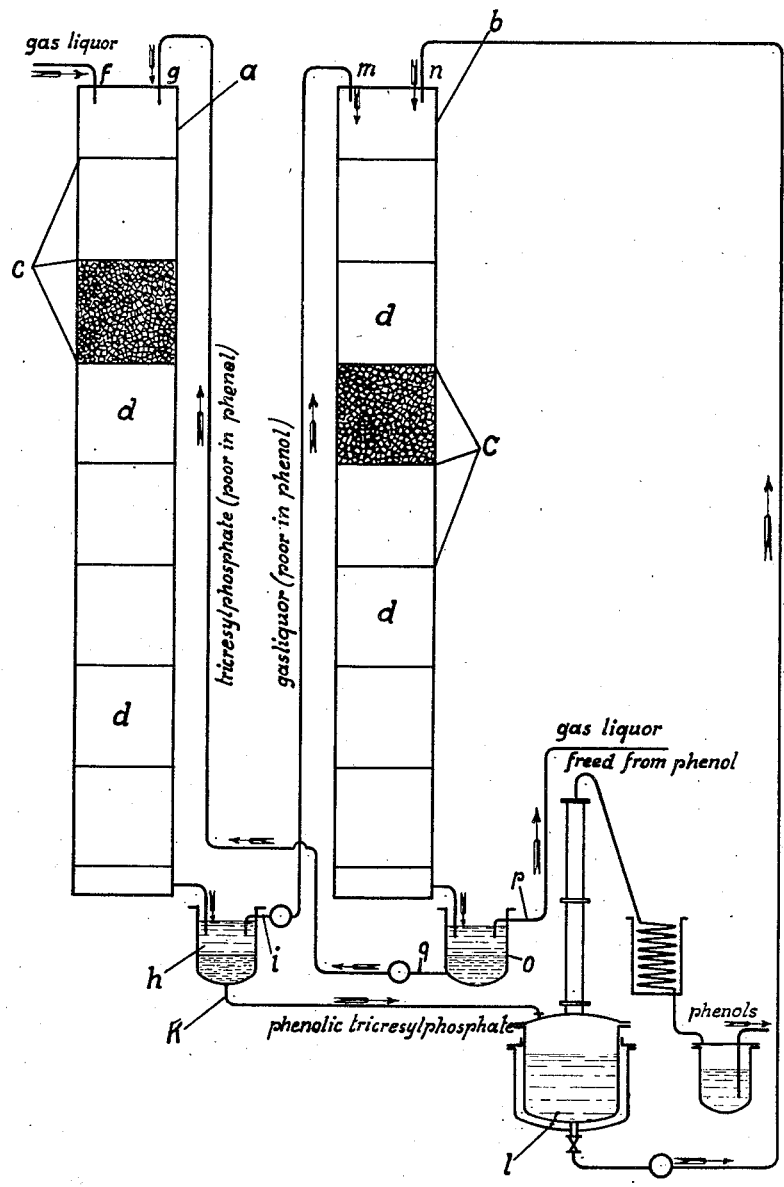

1,826,369

UNITED STATES PATENT OFFICE

CURT SCHOENBURG AND GERHARD VON DER BRUCK, OF BITTERFELD, GERMANY, ASSIGNORS TO I. G. FARBENINDUSTRIE AKTIENGESELLSCHAFT, OF FRANKFORT-ON-THE-MAIN, GERMANY

RECOVERY OF PHENOLS FROM GAS LIQUORS

Application filed November 26, 1929, Serial No. 409,938, and in Germany January 3, 1929.

This invention relates to the treatment of gas liquors and is more especially concerned with the recovery of certain products from the gas liquors obtained by the partial or complete gasification of carbonaceous matter, particularly of pit coal and lignite.

The gas liquors of coke-ovens, low-temperature carbonization plants, and in general of all operations in which pit coal or lignite, etc., is partially or completely gasified chiefly contain, in addition to ammonia and other substances of a basic character, such as amines, pyridines and their homologues, and other nitrogen derivatives, neutral oils and phenols, either dissolved or in suspension. The term "phenols" is, hereinafter, to be understood as applying to all the organic compounds containing at least one phenolic hydroxyl group; it therefore embraces, in addition to phenol in the strict sense, the cresols, xylenols, diphenols, triphenols, phenol-carboxylic acids, creosotes, creosotic acids, etc., which owing to their phenolic character are soluble in caustic alkalies. These phenoliferous contaminations are a source of great inconvenience on account of their poisonous nature and their obnoxious smell; and their elimination from the gas liquors forms a grave problem in many respects. In spite of repeated attempts to prevent the loss of these valuable substances no practical and economic process for their recovery has as yet been devised. It is an object of our present invention to provide a method by which these contaminations having a phenolic character may be most efficiently removed from gas liquors and recovered for further utilization.

To this end we bring liquor compounds of the triaryl-phosphate type, preferably tricresyl-phosphate which may be regarded as the main representative of this class of substances owing to its ready availability, which are non-volatile and insoluble in water, into intimate contact with gas liquors containing phenols. Absorption of the latter by the said compounds readily occurs and the phosphate compound loaded with phenols easily separates, owing to its insolubility in water, from the purified gas liquors. The phenols thus absorbed may then be separated from the phosphate liquid in the manner usually employed for isolating phenols. They may be distilled off, with or without the aid of steam and under ordinary or reduced pressure. It may, however, in certain cases be more convenient to extract the phenols from the phosphate with the aid of alkaline lyes, since the procedure offers the advantage of allowing the tarry products, which cannot be separated by distillation, to be washed out of the phosphate, thus rendering the latter available for further use without subjecting it to washing over again.

Since tricresyl-phosphate, in addition to phenols, also absorbs the amines contained in gas liquors, such as pyridin and the like, these also may be recovered by our method, if desired, preferably by blowing a current of steam through the alkaline washing agent prior to acidification. The neutral oils can be separated from the phosphate freed from phenols by heating or blowing with steam.

Besides the liquid triaryl phosphates also the liquid tertiary alkyl-aryl-phosphates and liquid trialkylphosphates (the latter with the exception of the trimethyl-, ethyl- and propyl-phosphate which are unsuitable for our process owing to their perceptible solubility in water) may be employed in the above described process in the same manner.

The effect of the treatment as described is due to the fact that the phenols are soluble in the liquid phosphate esters mentioned, in all proportions. The quantity of phosphates to be employed in the treatment, therefore, merely depends on the degree of purification of the gas-liquors aimed at and is governed by the well-known laws of relative solubility.

The following example illustrates a preferable mode of carrying out the present invention and an arrangement of apparatus suitable therefor. Reference is made to the accompanying diagrammatic drawing which forms part of the specification.

$a$ and $b$ are iron towers of about 8 metres height and 1 m. diameter provided with a number of perforated shelves $c$ and filled with tube sections of iron $d$ (so-called Raschig rings). The gas liquors coming from the scrubber $e$ of a producer gas plant, enter the upper end of tower $a$ at $f$ whilst liquid tricresylphosphate already containing a small quantity of phenols from tower $b$ is continuously supplied through $g$. Both liquids simultaneously percolate the layers of iron tube sections and are thus intimately mixed, whereby the tricresylphosphate is caused to take up the main portion of the phenols. The gas liquors having thus passed through tower $a$ are then separated from the tricresylphosphate in settling tank $h$ and led off through outlet $i$ to tower $b$. The tricresylphosphate charged with phenols is tapped at $k$ and conducted to a steam distillation plant indicated by $l$ for regenerating the solvent and recovering the phenols. The gas liquors having left the settling tank at $i$ are pumped to the upper end of tower $b$, entering it at $m$, whilst small quantities of pure tricresyl-phosphate coming from $l$ are simultaneously reintroduced at $n$. In this tower the gas liquors are subjected to a final treatment with the solvent resulting in the removal of practically all the phenol contents by separation in settling tank $o$. $p$ is an outlet for the purified gas liquors, whilst the tricresylphosphate charged with the remainder of phenols is led off at $q$ for further utilization in tower $a$.

When 5 cubic metres of gas liquor containing 0.5 percent of phenols and 0.15 cubic metres of tricresyl-phosphates per hour are supplied to the absorption plant described, the phenol contents are by the first absorption tower $a$, reduced to 0.11 percent—corresponding to an efficiency of 78 percent. The treatment in the second absorption tower $b$ brings the phenol contents further down to 0.034 percent, the total efficiency of purification thus amounting to 93.2 percent.

We claim:

1. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with tricresylphosphate, allowing the tricresylphosphate containing the phenols dissolved therein to separate from the residual liquor by means of gravity, separating the resulting liquid layers and separating the phenols from the tricresylphosphate.

2. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with tricresylphosphate, allowing the tricresylphosphate containing the phenols dissolved therein to separate from the residual liquor by means of gravity, separating the resulting liquid layers and separating the phenols from the tricresylphosphate by steam distillation.

3. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with liquid water-insoluble phosphoric acid esters of the general formula:

$$\begin{matrix} X_1 \\ X_2 \\ X_3 \end{matrix} PO_4$$

wherein $X_1$ $X_2$ and $X_3$ each stand for an aryl or alkyl group with more than three carbon atoms and $X_1$ $X_2$ and $X_3$ may denote identical or different radicles, allowing the phosphoric acid esters containing the phenols dissolved therein to separate from the residual liquor by means of gravity, separating the resulting liquid layers and separating the phenols from the phosphoric acid esters.

4. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with liquid water-insoluble phosphoric acid esters of the general formula:

$$\begin{matrix} X_1 \\ X_2 \\ X_3 \end{matrix} PO_4$$

wherein $X_1$ $X_2$ and $X_3$ each stand for an aryl or alkyl group with more than three carbon atoms and $X_1$ $X_2$ and $X_3$ may denote identical or different radicles, allowing the phosphoric acid esters containing the phenols dissolved therein to separate from the residual liquor by means of gravity, separating the resulting liquid layers and separating the phenols from the phosphoric acid esters by steam distillation.

5. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with liquid water-insoluble triarylphosphates, allowing the triarylphosphates containing the phenols dissolved therein to separate from the residual liquor by means of gravity, separating the resulting liquid layers and separating the phenols from the triarylphosphates.

6. In a process for recovering phenols from gas liquors by an extraction method making use of a water-insoluble organic liquid capable of dissolving phenols and being easily separable by means of gravity from the watery liquor, the improvement which comprises bringing the gas liquors into intimate contact with liquid water-insoluble triarylphosphates, allowing the triarylphosphates containing the phenols dissolved therein to separate from the residual liquor by means of gravity, separating the resulting liquid layers and separating the phenols from the triarylphosphates by steam distilation.

7. A process as defined in claim 1, in which the phenols are separated from the tricresylphosphate by extraction with caustic alkali solutions.

8. A process as defined in claim 3, in which the phenols are separated from the phosphoric acid ester by extraction with caustic alkali solutions.

9. A process as defined in claim 5, in which the phenols are separated from the triarylphosphates by extraction with caustic alkali solutions.

In testimony whereof, we affix our signatures.

CURT SCHOENBURG.
GERHARD von der BRUCK.